United States Patent [19]
Brown et al.

[11] Patent Number: 5,375,939
[45] Date of Patent: Dec. 27, 1994

[54] CABLE JOINT BUFFER

[76] Inventors: Charles J. Brown, 88 Altham Grove, Harlow, Essex, CM20 2PJ; Alan R. Crameri, 26 Helens Close, Cambs CB5 8TW, both of United Kingdom

[21] Appl. No.: 104,818

[22] Filed: Aug. 10, 1993

[30] Foreign Application Priority Data

Aug. 27, 1992 [GB] United Kingdom ............... 9218248

[51] Int. Cl.$^5$ ............................................. G02B 6/44
[52] U.S. Cl. .................................. 403/300; 403/229; 403/23; 24/122.3
[58] Field of Search .................. 403/23, 50, 51, 229, 403/300; 24/122.3, 122.6, 131 C, 136 R

[56] References Cited

U.S. PATENT DOCUMENTS

| | | | |
|---|---|---|---|
| 2,177,364 | 10/1939 | Fotsch | 24/122.6 |
| 4,912,815 | 4/1990 | Jenkins | 24/136 R |
| 5,018,251 | 5/1991 | Brown | 24/136 R |
| 5,037,177 | 8/1991 | Brown et al. | 385/59 |
| 5,079,879 | 1/1992 | Rodriguez | 24/122.6 |
| 5,278,353 | 1/1994 | Buchholz et al. | 403/314 |

*Primary Examiner*—Edward K. Look
*Assistant Examiner*—Michael S. Lee
*Attorney, Agent, or Firm*—Lee, Mann, Smith, McWilliams, Sweeney & Ohlson

[57] ABSTRACT

A tapered buffer for a cable joint comprising a threaded collar adapted to be screwed onto a complementary threaded end portion of a rigid housing, a helical spring attached at one end to the collar and a conical resilient body moulded over and extending beyond the free end of the spring, the buffer having a bore adapted to be a close sliding fit over the cable, wherein the pitch of the spring coils is varied along the axis of the spring to provide a controlled degree of flex for the cable entering the joint.

1 Claim, 2 Drawing Sheets

CABLE JOINT BUFFER

FIELD OF THE INVENTION

This invention relates to cable joints for armoured cables, and in particular to so-called "buffers" or "boots" which provide controlled flexing conditions for a length of cable entering or exiting a rigid joint housing.

BACKGROUND OF THE INVENTION

It is conventional practice to provide a tapered moulded buffer, e.g. of polyurethane, over a length of cable entering or exiting a rigid housing to control the amount of flexing of the cable during deployment of the cable over sheaves and through cable engines on board cable laying ships. Hitherto a common method of providing such tapered buffers has been to apply first to the cable at a short distance from the housing a split collar to form a key for anchoring the buffer against longitudinal slippage on the cable. Next a longitudinal split buffer is placed about the cable and this is clamped to each end. Split buffers are usually secured by a circumferential "jubilee" clip and application of PVC tape. A major disadvantage is that during deployment of the cable bending thereof tends to cause the split buffer to open up along the split between its two clamped ends, thus allowing the cable to bend excessively and to emerge laterally through the split.

SUMMARY OF THE INVENTION

According to the present invention there is provided a tapered buffer for a cable joint comprising a threaded collar adapted to be screwed onto a complementary threaded end portion of a rigid housing, a helical spring attached at one end to the collar and a conical resilient body moulded over and extending beyond the free end of the spring, the buffer having a bore adapted to be a close sliding fit over the cable.

BRIEF DESCRIPTION OF THE DRAWINGS

Embodiments of the invention will now be described with reference to the accompanying drawings, in which.

DESCRIPTION OF A PREFERRED EMBODIMENT

Figure 1:
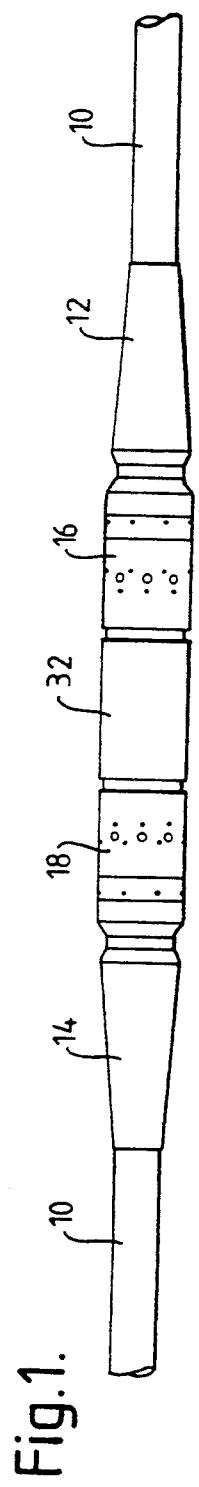
FIG. 1 is an overall view of a rigid cable joint.
Figure 2:
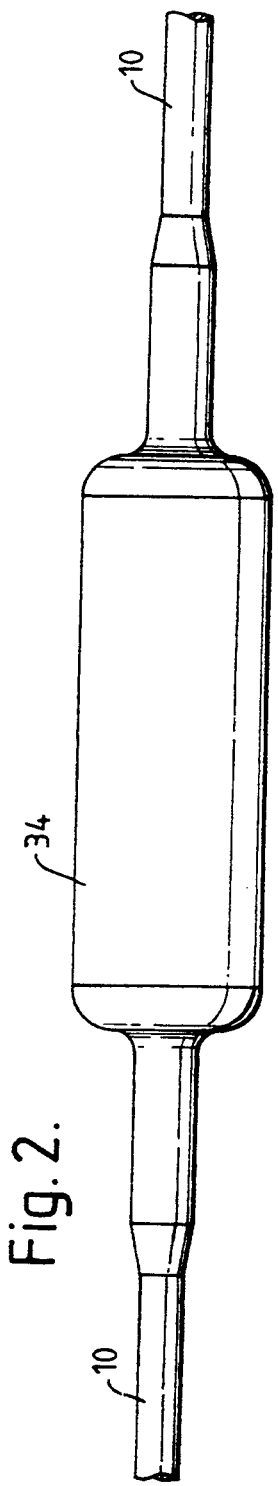
FIG. 2 is a view of a dielectric encased light-weight cable joint.
Figure 3:
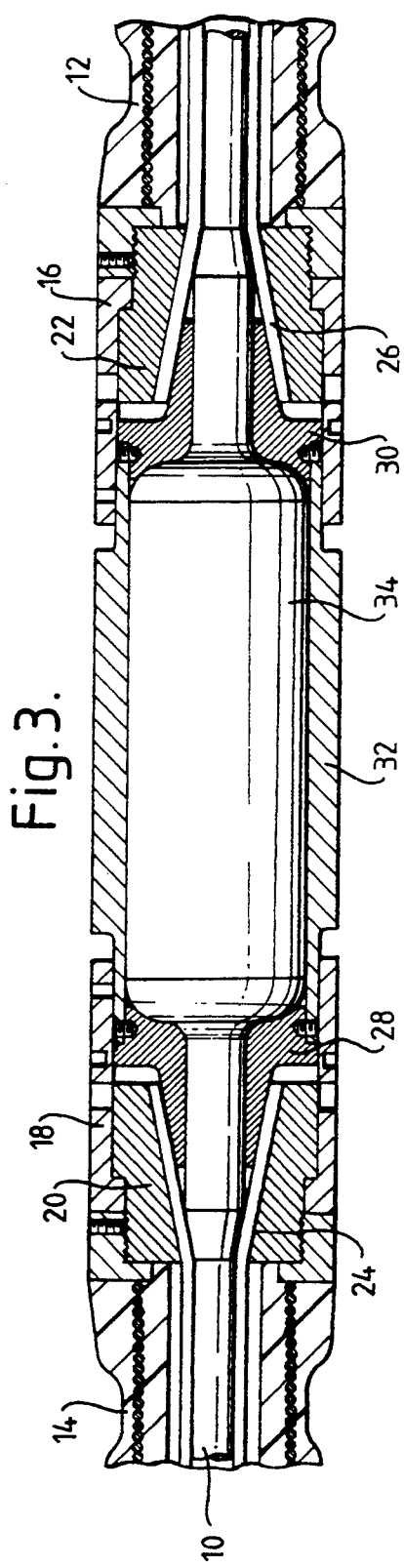
FIG. 3 is a schematic detailed cross-section view of a rigid cable joint.
Figure 4:
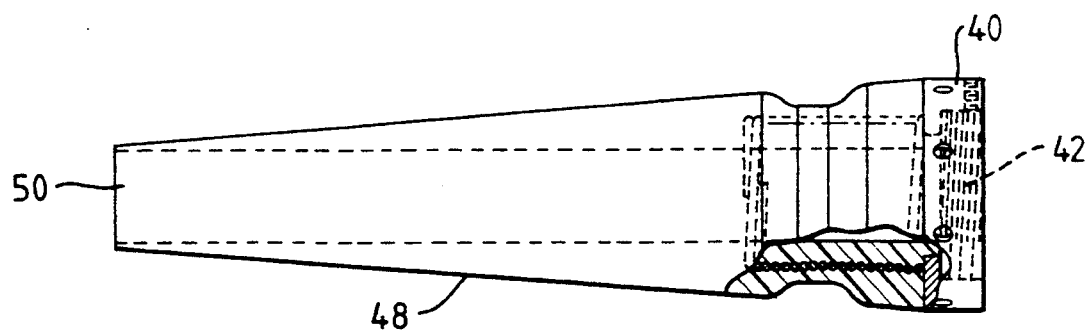
FIG. 4 is a view of a buffer.
Figure 5:
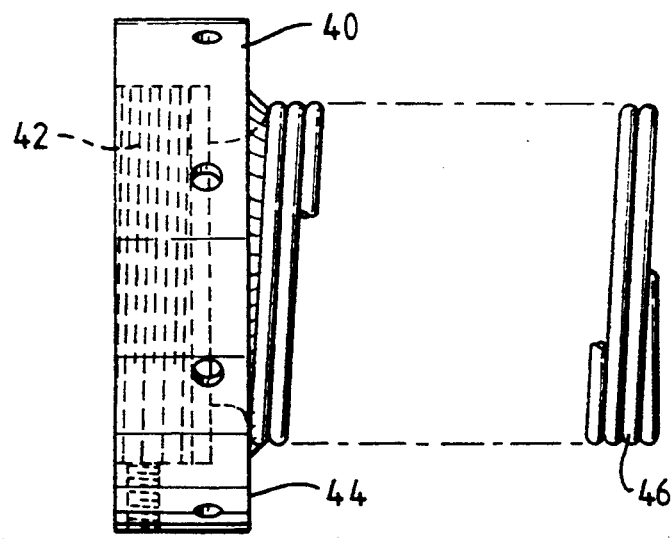
FIG. 5 is a schematic detail of part of a buffer.

Fabrication of a joint in a cable 10 involves firstly sliding over each free end of the cable one piece buffers, 12, 14; end-caps 16, 18; internally tapered collets 20, 22. Next the armour wires 24, 26 are unlaid for a distance from the two ends of the cable and conical wedges 28, 30 are fitted over the unarmoured ends. Finally a steel sleeve 32, which forms the main rigid housing, is slipped over one of the cable ends. Next a lightweight joint is made between the prepared cable ends. A mould (not shown) is then clamped over the joint and a suitable dielectric, e.g. polythene, is moulded around the joint to provide an insulating body 3A. When the including operation is completed the steel sleeve 32 is slid along the cable to encase the moulded body 34. The wedges 28, 30 are moved up to abut the ends of the moulded body 34 and the ends of the armour wires 24, 26 are relaid over the conical portions of the wedges. The conical collets 20, 22 are moved up against the armour wires splayed out over the wedges and axially loaded to grip the armour wires while the end-caps 16, 18 are then screwed into the threaded ends of the steel sleeve 32. Finally the buffers 12 and 14 are moved up and screwed onto the conical collets.

The buffers 12, 14 are constructed with a collar 40 having an internally threaded recess 42 which will engage a complementary threaded boss on the conical collet. The collar has a flange portion 44 to which is welded a helical spring 46. A conical rubber body 48 is moulded over the spring. The rubber body is formed with a bore 50 which is designed to be a close sliding fit over the cable. The pitch of the coils along the axis of the spring can be varied to provide, together with the conical profile of the rubber moulding, a controlled degree of flex for the cable entering the rigid joint housing. To provide a secure anchorage for the rubber moulding the coils of the spring can be abraded and roughened.

We claim:

1. A tapered buffer for a cable joint comprising a threaded collar adapted to be screwed onto a complementary threaded end portion of a rigid housing, a helical spring attached at one end to the collar and a conical resilient body moulded over and extending beyond the free end of the spring, the buffer having a bore adapted to be a close sliding fit over the cable, wherein the pitch of the spring coils is varied along the axis of the spring to provide a controlled degree of flex for the cable entering the joint.

* * * * *